US012792397B2

(12) United States Patent
Pedrejon Rodriguez et al.

(10) Patent No.: US 12,792,397 B2
(45) Date of Patent: Nov. 10, 2026

(54) COMMAND TRANSMISSION BASED ON AN ELECTRICAL MEASUREMENT IN AN EVENT SYSTEM

(71) Applicant: Honeywell International Inc., Charlotte, NC (US)

(72) Inventors: Carlos Pedrejon Rodriguez, Barcelona (ES); Francisco Vaquero, Barcelona (ES)

(73) Assignee: Honeywell International Inc., Charlotte, NC (US)

( * ) Notice: Subject to any disclaimer, the term of this patent is extended or adjusted under 35 U.S.C. 154(b) by 530 days.

(21) Appl. No.: 18/236,558

(22) Filed: Aug. 22, 2023

(65) Prior Publication Data

US 2025/0068465 A1 Feb. 27, 2025

(51) Int. Cl.
*G06F 9/48* (2006.01)
*G06F 9/54* (2006.01)

(52) U.S. Cl.
CPC ............ *G06F 9/4887* (2013.01); *G06F 9/542* (2013.01)

(58) Field of Classification Search
CPC ............................... G06F 9/4887; G06F 9/542
See application file for complete search history.

(56) References Cited

U.S. PATENT DOCUMENTS 4,977,527 A * 12/1990 Shaw ..................... G08B 17/10 340/630
5,661,463 A 8/1997 Letchak et al.
5,864,286 A * 1/1999 Right ................... G08B 26/001 340/517
6,104,286 A 8/2000 Luquette
6,820,154 B2 * 11/2004 Smith ..................... G06F 13/24 713/323
7,382,245 B2 6/2008 Girouard
7,437,596 B2 * 10/2008 McFarland ......... H04W 40/248 700/20
8,020,025 B2 * 9/2011 Hyatt .................... G06F 1/3228 713/502
10,885,771 B2 1/2021 Steffen
11,367,339 B2 * 6/2022 Vannebo ................ G08B 25/04
11,393,325 B2 7/2022 Bennett et al.
2009/0009352 A1 1/2009 Savage, Jr. et al.
2010/0073175 A1 * 3/2010 Lontka ................ G08B 29/123 340/635
2012/0032794 A1 * 2/2012 Barrieau .............. G08B 29/181 340/514
2015/0221211 A1 8/2015 Barrieau et al.
2018/0212832 A1 7/2018 Baird et al.

(Continued)

*Primary Examiner* — Thomas D Alunkal
(74) *Attorney, Agent, or Firm* — Brooks, Cameron & Huebsch, PLLC

(57) ABSTRACT

Devices, systems, and methods for command transmission based on an electrical measurement in an event system. In some examples, one or more embodiments include a controller comprising a memory and a processor to execute instructions stored in the memory to determine an electrical measurement in an event device loop including a number of event devices connected to an event device panel, compare the electrical measurement to a threshold value, and determine, based on the comparison of the electrical measurement to the threshold value, a plurality of commands to be transmitted to the event devices in the event device loop.

15 Claims, 3 Drawing Sheets

(56) References Cited

U.S. PATENT DOCUMENTS

| | | | | |
|---|---|---|---|---|
| 2020/0184801 | A1 * | 6/2020 | Matsuda .............. | G08B 26/004 |
| 2021/0142649 | A1 * | 5/2021 | Cordoba Galera .. | G08B 21/185 |
| 2022/0319305 | A1 * | 10/2022 | Escofet Via ........... | G08B 29/26 |
| 2022/0366778 | A1 | 11/2022 | Barson et al. | |

* cited by examiner

COMMAND TRANSMISSION BASED ON AN ELECTRICAL MEASUREMENT IN AN EVENT SYSTEM

TECHNICAL FIELD

The present disclosure relates to devices, systems, and methods for command transmission based on an electrical measurement in an event system.

BACKGROUND

Facilities, such as commercial facilities, office buildings, hospitals, campuses (e.g., including buildings and outdoor spaces), and the like, may have an event system that can be triggered during an event, such as an emergency situation (e.g., a fire) to warn occupants to evacuate. Such an event system may include an alarm system having a control panel and a number of event devices (e.g., sensors, sounders, pull stations, etc.) located throughout the facility (e.g., on different floors and/or in different rooms of the facility) that can perform an action when an event (e.g., a hazard event, a fault event, etc.) is occurring in the facility. In an example of an event, the number of event devices may provide a notification of the event to the occupants of the facility via alarms and/or other mechanisms.

DETAILED DESCRIPTION

Figure 1:
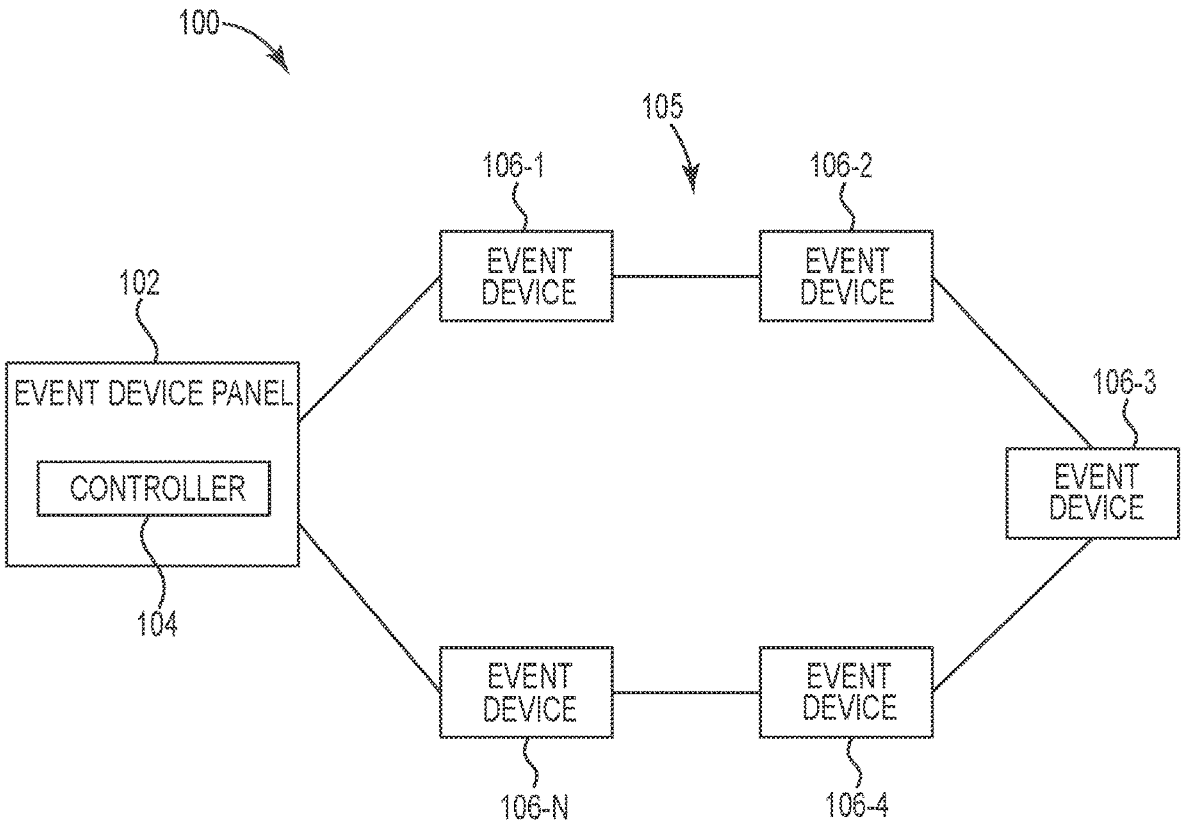
FIG. 1 is an example of a system for command transmission based on an electrical measurement in an event system, in accordance with one or more embodiments of the present disclosure.

Devices, systems, and methods for command transmission based on an electrical measurement in an event system. In some examples, one or more embodiments include a controller comprising a memory and a processor to execute instructions stored in the memory to determine an electrical measurement in an event device loop including a number of event devices connected to an event device panel, compare the electrical measurement to a threshold value, and determine, based on the comparison of the electrical measurement to the threshold value, a plurality of commands to be transmitted to the event devices in the event device loop.

A facility can utilize an event system in order to warn occupants of the facility of an emergency event, such as a fire. An event system can be a system of devices that operate to collect information about a facility and provide the collected information for analysis. Such an event system can also take actions based on the collected information, such as providing an audible and/or visible warning in an emergency event. For example, the event system can utilize event devices to warn occupants of the emergency event occurring in the space, such as a fire. As used herein, the term “event device” refers to a device that can receive an input relating to an event and/or generate an output relating to an event. Such event devices can be a part of the event system of a space in a facility/in the facility at large and can include devices such as fire sensors, smoke detectors, heat detectors, carbon monoxide (CO) detectors, or combinations of these; air quality sensors; interfaces; manual call points (MCPs); pull stations; input/output modules; aspirating units; and/or audio/visual devices (e.g., speakers, sounders, flashers, buzzers, microphones, cameras, video displays, video screens, etc.), relay output modules, among other types of event devices. Such event devices may also include self-test capabilities.

The control panel can be connected to the number of event devices and can provide power to the number of event devices. For example, the number of event devices can be connected in an event device loop and be connected to the control panel. The control panel can apply a voltage to the event device loop in order to power the event devices on the event device loop. Such power can allow the event devices to perform actions, such as communication between an event device and the control panel, self-test procedures, and/or provide an audible and/or visible warning in an emergency event, among other actions.

During operation, the voltage applied by the control panel on the event device loop can drop with loop resistance and current demands from event devices on the event device loop. Loop resistance can be a function of conductor resistance and in-line components such as isolators, etc.

Current on the event device loop may be estimated by determining a standby current and an alarm current. The standby current can be an amount of current that powers event devices on the event device loop in a non-alarm state, whereas the alarm current can be an amount of current that powers the event devices on the event device loop in an alarm state, and can be a higher amount than the standby current. In previous approaches, estimations of the standby current and the alarm current are typically performed when the panel is designed, installed, and/or commissioned.

However, such an approach does not account for transient conditions on the event device loop. For example, when a command is transmitted from the control panel to an event device on the event device loop, such a command transmission results in an amplitude modulation of the signal on the event device loop, resulting in a lower voltage and a higher current. This lower voltage results in event devices not being properly powered, and when the voltage returns to normal level, a current demand on the event device loop can be observed that is higher than the normal standby current.

Additionally, in a scenario where the event devices are in an alarm state, both current and resistance can be high, leading to a large voltage drop. In such a scenario, if the control panel attempts to transmit a command to the event devices, such a command may not reach the intended event device.

In previous approaches, mitigating this voltage drop at the control panel included providing a higher voltage at the control panel powering the event device loop. However, the event devices can include a maximum voltage they can withstand at the beginning of the event device loop where the voltage drop is the lowest. Additionally, previous approaches included reducing resistance or load on the event device loop. However, reducing resistance or load can lead to reduced event device functionality.

Command transmission based on an electrical measurement in an event system, according to the present disclosure, can allow for dynamic monitoring of electrical measurements on an event device loop. Such dynamic monitoring can allow for prioritization of commands to be transmitted on the event device loop based on the electrical measurement. As such, commands may be transmitted at certain times to ensure that such commands reach the intended event device based on the electrical conditions on the event device loop. Additionally, transmission of commands at certain times can account for changes in the event device loop. Accordingly, such an approach can allow for lower powered and/or legacy control panels to drive higher event device loop loads, allow control panels to be designed with lower voltages allowing for more lower voltage event devices, allow for higher powered event devices on event device loops, longer event device loops, and/or smaller section cabling on event device loops, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "04" in FIG. 1, and a similar element may be referenced as 304 in FIG. 3.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for command transmission based on an electrical measurement in an event system, in accordance with one or more embodiments of the present disclosure. The system 100 can include an event device panel 102 and event devices 106-1, 106-2, 106-3, 106-4, 106-N. The event device panel 102 can include controller 104.

As mentioned above, the system 100 can be included in a facility, a space in a facility, etc. The system 100 can include a device/series of devices in order to detect events and/or process and/or analyze the detected events to determine whether to generate an alarm for occupants of the facility.

For example, the system 100 can include event devices 106-1, 106-2, 106-3, 106-4, 106-N (referred to collectively as event devices 106). The event devices 106 can be devices to detect an event and transmit the detected event for processing and/or analysis. As mentioned above, the event devices 106 can include, for example, cameras, motion sensors, fire sensors, smoke detectors, heat detectors, carbon monoxide (CO) detectors, fixed gas and/or flame detectors, aspirating smoke detectors, beam smoke detectors, or combinations of these; air quality sensors; interfaces; manual call points (MCPs); pull stations; input/output modules; aspirating units; sprinkler controls; and/or audio/visual devices (e.g., speakers, microphones, cameras, video displays, video screens, etc.), relay output modules, among other types of event devices. Additionally, event devices 106 may also include self-test capabilities.

The system 100 can further include an event device panel 102. The event device panel 102 can be utilized to control the various event devices 106 included in the system 100.

As illustrated in FIG. 1, the event device panel 102 can be connected to the event devices 106 in an event device loop 105. The event device loop 105 can be a closed electrical path through different nodes. For example, the event device loop 105 can consist of a closed loop between event device 106-1, 106-2, 106-3, 106-4, 106-N, and finally the event device panel 102.

Accordingly, and as mentioned above, the event device panel 102 can be connected to the event devices 106, provide power to the event devices 106, and/or transmit a plurality of commands to the event devices 106 via the event device loop 105. For example, the event device panel 102 can apply a voltage to the event device loop 105 in order to power event devices 106 on the event device loop 105. Such power can allow the event devices 106 to perform actions, such as communication between an event device 106 and the event device panel 102, self-test procedures, and/or provide an audible and/or visible warning in an emergency event, among other actions.

As is further described below, the controller 104 can compare an electrical measurement to a threshold value to determine whether to transmit a command/a plurality of commands to the event devices 106 on the event device loop 105. To determine the threshold value, the controller 104 can calculate a maximum current value on the event device loop 105. The maximum current value on the event device loop 105 can correspond to a current value when all of the event devices 106 are activated at the same time. Accordingly, the controller 104 can calculate the maximum current value based on the event devices 106 (e.g., the types of event devices 106, how much current they draw, etc.) all being activated at the same time.

Once the controller 104 calculates the maximum current value, the controller 104 can assign the maximum current value as the threshold value. For example, the controller 104 can calculate the maximum current value when all of the event devices 106 are activated at the same time to be 400 milliAmps (mA). Accordingly, the controller 104 can assign the maximum current value of 400 mA as the threshold value. Such a determination may be initially performed during installation and/or commissioning of the system 100. However, embodiments of the present disclosure are not limited to determining the threshold value during installation and/or commissioning of the system 100. For example, the controller 104 can determine a revised threshold value if a change in the event device loop 105 is detected, as is further described herein.

As mentioned above, the event device panel 102 can transmit a plurality of commands to the event devices 106. Such commands can include priority commands and non-priority commands. As used herein, the term "priority command" refers to a transmission to determine whether an event device 106 is in an alarm condition or not. As used herein, the term "alarm condition" refers to a condition in which an event device has detected an event. For example, event device 106-1 can be a smoke detector, and in response to the event device 106-1 detecting smoke, the event device

106-1 can enter an alarm condition indicating that a detector included in the event device 106-1 has detected smoke.

The commands can also include non-priority commands. As used herein, the term "non-priority command" refers to a transmission to determine peripheral information about an event device 106. For example, the peripheral information can include any information not related to whether the event device 106 is in an alarm condition. Such information can include whether the event device 106 is still connected to the event device loop 105 (e.g., presence detection), a manufacturing date of the event device 106, type identifier of the event device 106, the status of the event device 106 (e.g., whether the event device is operating normally or has a fault), the status of a detector included in the event device 106 (e.g., whether the detector is clean or dirty), etc.

As mentioned above, the commands to be transmitted can include priority commands and non-priority commands. Such priority commands and non-priority commands can make up a plurality of commands that the controller 104 can determine whether to transmit, as is further described herein.

As mentioned above, transmission of such commands to the event devices 106 on the event device loop 105 can cause an amplitude modulation on the event device loop 105. Such an amplitude modulation can result in a lower voltage and a higher current, where the lower voltage can cause event devices 106 to not be properly powered, and when the voltage returns to normal, a current demand on the event device loop 105 can result in a higher current than the normal standby current of the event device loop 105. Accordingly, the controller 104 can determine whether to transmit and/or delay certain commands to the event devices 106 on the event device loop 105 based on an electrical measurement, as is further described herein.

For example, the controller 104 can determine an electrical measurement in an event device loop 105 including the event devices 106 connected to the event device panel 102. In some examples, the electrical measurement can be a current value on the event device loop 105. For instance, in a first example, the controller 104 can determine an electrical measurement on the event device loop 105 to be 200 mA. In a second example, the controller 104 can determine the electrical measurement on the event device loop 105 to be 430 mA.

Once the electrical measurement is determined, the controller 104 can compare the electrical measurement to the threshold value. For example, the controller 104 can compare the electrical measurement to the threshold value (e.g., 400 mA). The controller 104 can then determine commands of the plurality of commands having a particular command type (e.g., priority and/or non-priority) to the event devices 106 in the event device loop 105 based on the comparison of the electrical measurement to the threshold value, as is further described herein.

In the first example, the controller 104 can determine the electrical measurement to be 200 mA and compare the 200 mA electrical measurement to the threshold value (e.g., 400 mA). In response to the electrical measurement being less than the threshold value, the controller 104 can determine the command type to include a predetermined command and a non-predetermined command. For example, at the point in time when the controller 104 determines the electrical measurement to be 200 mA, the event devices 106 on the event device loop 105 are not experiencing a voltage drop and/or demand in current.

Accordingly, while priority commands may still be transmitted to the event devices 106 (e.g., commands to determine whether the event devices 106 are in an alarm state or non-alarm state), non-priority commands may also be transmitted without the possibility of priority command transmissions being disrupted and not reaching the event devices 106. That is, the controller 104 can transmit the command to the event devices 106 in response to the electrical measurement being less than the threshold value, where the command can be a priority command and/or a non-priority command. For example, the controller 104 can transmit a priority command to the event devices 106 to determine whether any of the event devices 106 are in an alarm state, and can also transmit a non-priority command to determine whether the event devices 106 are operating normally or have a fault, manufacturing dates of the event devices 106, etc.

In the second example, the controller 104 can determine the electrical measurement to be 430 mA and compare the 430 mA electrical measurement to the threshold value (e.g., 400 mA). In response to the electrical measurement being greater than the threshold value, the controller 104 can determine the command type to include only a predetermined command. For example, at the point in time when the controller 104 determines the electrical measurement to be 430 mA, the event devices 106 on the event device loop 105 are experiencing a voltage drop and/or demand in current.

Accordingly, non-priority commands are temporarily not to be transmitted. Rather, only priority commands may be transmitted to the event devices 106 (e.g., commands to determine whether the event devices 106 are in an alarm state or non-alarm state). That is, the controller 104 can transmit the command to the event devices 106 in response to the electrical measurement being greater than the threshold value, where the command can only be a priority command. For example, the controller 104 can transmit a priority command to the event devices 106 to determine whether any of the event devices 106 are in an alarm state but prevents/delays transmission of any non-priority commands. By transmitting only priority commands (and not transmitting non-priority commands), the controller 104 can ensure that the priority commands (e.g., commands to determine whether the event devices 106 are in an alarm state or non-alarm state) will reach the event devices 106. Such an approach can prioritize transmission of priority commands to event devices 106 over non-priority commands under certain event device loop 105 conditions, ensuring the event device panel 102 can determine whether the event devices 106 are detecting events in the facility under any event device loop 105 conditions, without increasing the voltage at the event device panel 102 or reducing resistance or load on the event device loop 105.

As mentioned above, conditions on the event device loop 105 can be transient and dynamic. For example, while the electrical measurement may exceed the threshold value at a first time, as conditions of the event device loop 105 change, the electrical measurement may decrease such that the electrical measurement would not exceed the threshold value at a second time.

Accordingly, in response to the electrical measurement being greater than the threshold value, the controller 104 can schedule a subsequent electrical measurement. For example, the controller 104 can schedule (e.g., 2 minutes after the controller 104 determines the electrical measurement is greater than the threshold value) a subsequent electrical measurement. Additionally, similar to the process above, the controller 104 can determine the subsequent electrical measurement at the scheduled time and compare the subsequent electrical measurement to the threshold value in response to the subsequent electrical measurement being determined. In response to the subsequent electrical measurement being less than the threshold value, the controller 104 can transmit the command to the event devices 106, where the command can be a priority command and/or a non-priority command. Accordingly, scheduling a subsequent electrical measurement can ensure that non-priority commands are not transmitted for a predetermined period of time (e.g., 2 minutes) as long as the subsequent electrical measurement is less than the threshold value.

Although the controller 104 is described above as scheduling the subsequent electrical measurement 2 minutes after the controller 104 determines the electrical measurement is greater than the threshold value, embodiments of the present disclosure are not so limited. For example, the controller 104 can schedule the subsequent electrical measurement less than 2 minutes or greater than 2 minutes after the controller 104 determines the electrical measurement is greater than the threshold value, allowing for non-priority commands to not be transmitted for different predetermined periods of time.

While the threshold value may be determined to be the maximum current value on the event device loop 105, in some instances the event device loop 105 may be changed. For example, the event device loop 105 may change after the event device loop 105 was installed/commissioned in the facility. For instance, a change in the event device loop 105 may occur if an addition of an event device 106 to the event device loop 105 occurs (e.g., a building manager adds an additional pull station, smoke detector, heat detector, etc.), an event device 106 is removed from the event device loop 105 (e.g., a building manager removes a CO detector and does not replace it), changes a type of event device 106 in the event device loop 105 (e.g., swaps out a smoke detector as event device 106-2 and replaces event device 106-2 with a heat detector), a fault occurs in an event device 106 (e.g., event device 106-4 develops a fault due to dust or other contaminant buildup), and/or any other type of change in the event device loop 105.

The controller 104 can monitor the event device loop 105 for a change in the event device loop 105. For example, the controller 104 may detect, via a change in an electrical measurement of the event device loop 105, through receipt of information from the transmission of non-priority commands, or any other method, that a change has occurred in the event device loop 105.

Accordingly, the controller 104 can determine a revised threshold value (e.g., revised threshold electrical measurement) in response to the change being detected in the event device loop 105. Similar to the approach described above, the controller 104 can calculate a revised maximum current value on the event device loop 105 corresponding to a current value when all of the event devices 106 are activated at the same time. Accordingly, the controller 104 can calculate the revised maximum current value based on the event devices 106 (e.g., the types of event devices 106, how much current they draw, etc.) all being activated at the same time and assign the revised maximum current value as the revised threshold value. The revised threshold value can then be utilized to compare with the electrical measurement determined by the controller 104, as described above.

Accordingly, command transmission based on an electrical measurement in an event system according to the disclosure can allow dynamic monitoring of electrical measurements on an event device loop to ensure that priority commands are prioritized for transmission over non-priority commands to ensure that the priority commands are received by event devices on the event device loop. In addition to allowing for lower powered and/or legacy control panels to drive higher event device loop loads, allow control panels to be designed with lower voltages allowing for more lower voltage event devices, allow for higher powered event devices on event device loops, longer event device loops, and/or smaller section cabling on event device loops, such an approach can allow for safer and less costly facility operation, as compared with previous approaches.

Figure 2:
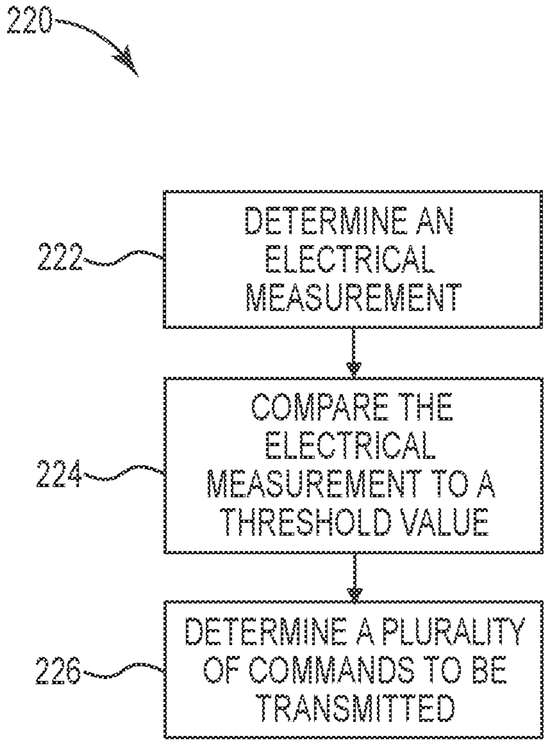
FIG. 2 is an example of a method for command transmission based on an electrical measurement in an event system, in accordance with one or more embodiments of the present disclosure.

FIG. 2 is an example of a method 220 for command transmission based on an electrical measurement in an event system, in accordance with one or more embodiments of the present disclosure. The method 220 may be performed by a controller (e.g., controller 104, previously described in connection with FIG. 1, and controller 304, as is further described in connection with FIG. 3).

At 222, the method 220 can include determining, by a controller included in an event device panel, an electrical measurement in an event device loop. For example, an event device loop can include a number of event devices. The number of event devices can be connected to an event device panel including the controller. In a first example, the controller can determine the electrical measurement to be 200 mA. In a second example, the controller can determine the electrical measurement to be 430 mA.

At 224, the method 220 can include comparing, by the controller, the electrical measurement to a threshold value. In the first example, the controller can compare the electrical measurement of 200 mA to the threshold value of 400 mA. In the second example, the controller can compare the electrical measurement of 430 mA to the threshold value of 400 mA.

At 226, the method 220 can include determining, by the controller, a plurality of commands to be transmitted. For instance, in the first example, the controller can transmit a command to the number of event devices in response to the electrical measurement being less than the threshold value, where the command includes a priority command and a non-priority command. However, in the second example, the controller can transmit a priority command to the number of event devices but delay transmission of a non-priority command to the number of event devices in response to the electrical measurement being greater than the threshold value.

As previously described in connection with FIG. 1, the number of event devices may include a fire device. Such a fire device may include a smoke detector, heat detector, CO detector, etc. Accordingly, in some examples, the priority command can include a command to activate the fire device in response to an event being detected. For example, in response to the controller transmitting a priority command to the fire device (e.g., whether the fire device is in an alarm condition or not), the fire device may transmit a response to the controller stating the fire device is in an alarm condition. Accordingly, the controller can transmit another priority command to the fire device to cause the fire device to activate.

Additionally, in some examples, the priority command can include a command to cause the fire device to perform an automatic self-test procedure. For example, the controller can transmit a priority command to the fire device to cause the fire device to perform an automatic self-test procedure.

In some examples, the controller can monitor a voltage at the event device panel. In an example in which the voltage exceeds a threshold voltage, the controller can generate an alarm.

Figure 3:
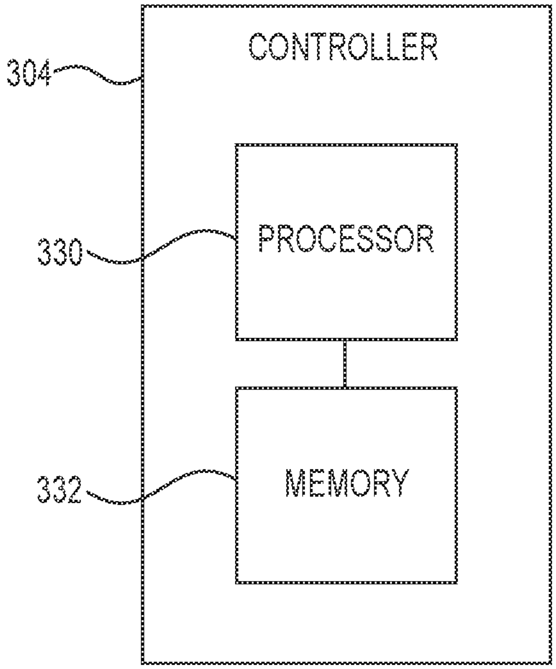
FIG. 3 is an example of a controller for command transmission based on an electrical measurement in an event system, in accordance with one or more embodiments of the present disclosure.

FIG. 3 is an example of a controller 304 for command transmission based on an electrical measurement in an event system, in accordance with one or more embodiments of the present disclosure. As illustrated in FIG. 3, the controller 304 can include a memory 332 and a processor 330 for command transmission based on an electrical measurement in an event system, in accordance with the present disclosure.

The memory 332 can be any type of storage medium that can be accessed by the processor 330 to perform various examples of the present disclosure. For example, the memory 332 can be a non-transitory computer readable medium having computer readable instructions (e.g., executable instructions/computer program instructions) stored thereon that are executable by the processor 330 for command transmission based on an electrical measurement in an event system in accordance with the present disclosure.

The memory 332 can be volatile or nonvolatile memory. The memory 332 can also be removable (e.g., portable) memory, or non-removable (e.g., internal) memory. For example, the memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 332 is illustrated as being located within controller 304, embodiments of the present disclosure are not so limited. For example, memory 332 can also be located internal to another computing resource (e.g., enabling computer readable instructions to be downloaded over the Internet or another wired or wireless connection).

The processor 330 may be a central processing unit (CPU), a semiconductor-based microprocessor, and/or other hardware devices suitable for retrieval and execution of machine-readable instructions stored in the memory 332.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller for command transmission based on an electrical measurement in an event system, comprising:
a memory; and
a processor configured to execute executable instructions stored in the memory to:
determine an electrical measurement in an event device loop including a number of event devices connected to an event device panel;
compare the electrical measurement to a threshold value; and
determine, in response to the comparison of the electrical measurement being less than the threshold value, a plurality of commands to be transmitted to the event devices in the event device loop, wherein the plurality of commands include:
a priority command to determine whether the event devices are in an alarm condition; and
a non-priority command to determine peripheral information about the event devices not related to whether the event devices are in an alarm condition; and
transmit the priority command and the non-priority command to the event devices.

2. The controller of claim 1, wherein the processor is configured to execute the instructions to:
determine, in response to the electrical measurement being greater than the threshold value, a command to be transmitted to the event devices, wherein the command includes only a priority command to determine whether the event devices are in an alarm condition; and
transmit only the priority command to the number of event devices.

3. The controller of claim 2, wherein the processor is configured to execute the instructions to:
schedule a subsequent electrical measurement in response to the electrical measurement being greater than the threshold value; and
compare the subsequent electrical measurement to the threshold value in response to the subsequent electrical measurement being determined.

4. The controller of claim 3, wherein the processor is configured to execute the instructions to transmit the priority command and the non-priority command to the number of event devices in response to the subsequent electrical measurement being less than the threshold value.

5. The controller of claim 1, wherein the processor is configured to execute the instructions to determine the threshold value by:
calculating a maximum current value on the event device loop when all of the event devices on the event device loop are activated at a same time; and
assigning the maximum current value as the threshold value.

6. A non-transitory computer readable medium having computer readable instructions stored thereon that are executable by a processor to:
determine a current value in an event device loop including a number of event devices connected to an event device panel;
compare the current value to a threshold current;
determine, in response to the current value to being less than the threshold current, a plurality of commands to be transmitted to the event devices in the event device loop, wherein the plurality of commands include:
a priority command to determine whether the event devices are in an alarm condition; and a non-priority command to determine peripheral information about the event devices not related to whether the event devices are in an alarm condition; and transmit the priority command and the non-priority command to the event devices.

7. The computer readable medium of claim 6, wherein the computer readable instructions are executable by the processor to determine, in response to the current value being greater than the threshold current, a command to be transmitted to the event devices, wherein the command to be transmitted includes only a priority command to determine whether the event devices are in an alarm condition.

8. The computer readable medium of claim 7, wherein the computer readable instructions are executable by the processor to transmit only the priority command and not the non-priority command to the number of event devices in response to the current value being greater than the threshold current.

9. The computer readable medium of claim 6, wherein the computer readable instructions are executable by the processor to monitor the event device loop for a change in the event device loop.

10. The computer readable medium of claim 9, wherein the computer readable instructions are executable by the processor to determine a revised threshold electrical measurement in response to the change being detected in the event device loop.

11. The computer readable medium of claim 9, wherein the change in the event device loop includes at least one of:

an addition of an event device to the number of event devices in the event device loop;

removal of an event device from the number of event devices in the event device loop; and a fault occurring in an event device of the number of event devices in the event device loop.

12. A system for command transmission based on an electrical measurement in an event system, comprising:

an event device loop including a number of event devices;

an event device panel connected to the number of event devices; and a controller included in the event device panel, the controller configured to:

determine a current value in the event device loop;

compare the current value to a threshold current;

transmit, in response to the current value being less than the threshold current, a plurality of commands to the number of event devices, wherein the plurality of commands include:

a priority command to determine whether the event devices are in an alarm condition; and a non-priority command to determine peripheral information about the event devices not related to whether the event devices are in an alarm condition; and in response to the current value being greater than the threshold current:

transmit only the priority command to the number of event devices; and delay transmission of the non-priority command to the number of event devices.

13. The system of claim 12, wherein the controller is further configured to:

monitor a voltage at the event device panel; and generate an alarm in response to the voltage exceeding a threshold voltage.

14. The system of claim 12, wherein:

the number of event devices include a fire device; and the priority command includes a command to activate the fire device in response to an event being detected.

15. The system of claim 12, wherein:

the number of event devices include a fire device; and the priority command includes a command to cause the fire device to perform an automatic self-test procedure.

* * * * *